United States Patent [19]

Enga

[11] 4,384,549

[45] May 24, 1983

[54] BOILERS

[75] Inventor: Bernard E. Enga, Maidenhead, England

[73] Assignee: Johnson, Matthey & Co., Limited, London, England

[21] Appl. No.: 344,721

[22] Filed: Feb. 1, 1982

Related U.S. Application Data

[63] Continuation of Ser. No. 116,594, Jan. 28, 1980, abandoned.

[30] Foreign Application Priority Data

Feb. 2, 1979 [GB] United Kingdom ............... 7903818

[51] Int. Cl.³ .............................................. F22B 7/12
[52] U.S. Cl. .................... 122/149; 122/4 D; 122/75; 252/437
[58] Field of Search ......................... 122/4 D, 149, 75; 252/437; 110/210

[56] References Cited

U.S. PATENT DOCUMENTS 2,658,742  11/1953  Suter et al. ...................... 110/210 X
4,196,099   4/1980  Hunter et al. ....................... 252/437

FOREIGN PATENT DOCUMENTS 6307 of 1880 United Kingdom ............... 122/4 D

Primary Examiner—Edward G. Favors
Attorney, Agent, or Firm—Cushman, Darby & Cushman

[57] ABSTRACT

This invention relates to boilers more particularly to shell boilers and improvements in their operation.

In more detail this specification describes and claims a boiler comprising a housing, an inlet for leading a fuel or a fuel/gas mixture into a combustion chamber, at least one array of pipes in series with the combustion chamber, an exit for leading exhaust gases away from the boiler and means for cooling the pipes and the combustion chamber, characterized in that the boiler includes a catalyst disposed in such a position that at least a proportion of any unburnt fuel leaving the combustion chamber undergoes catalytic combustion.

2 Claims, 1 Drawing Figure

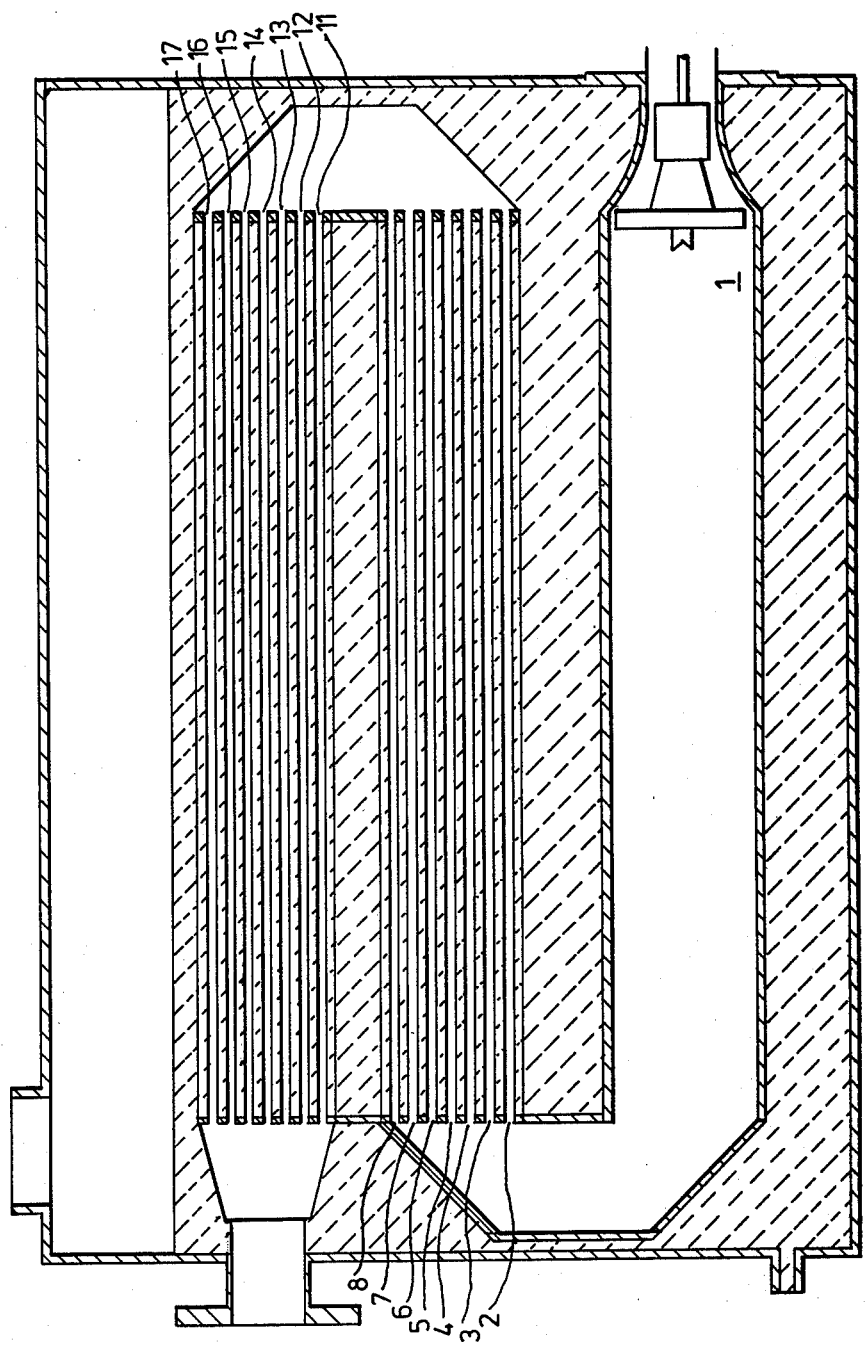

BOILERS

This is a continuation of application Ser. No. 116,594 filed Jan. 28, 1980 now abandoned.

This invention relates to boilers more particularly to shell boilers and improvements in their operation.

In a conventional boiler, combustion takes place in one chamber and the heat is extracted by a coolant, such as water, which is passed through pipes placed adjacent to the chamber as well as in the stream of the exhaust gases. In a shell boiler, the fuel is burnt within a tube which is connected to an array of so-called "pass-pipes" through which the hot gases generated by the combustion pass and, thereafter, the hot gases are vented to atmosphere. The 'combustion tube' and the 'pass-pipes' are surrounded by cooling water which extracts the heat from them so that the water is itself heated and, ultimately steam is generated.

A typical arrangement of a shell boiler is shown diagrammatically in the sole FIGURE. The combustion tube or chamber 1 is long and narrow and is connected to an array of pass-pipes. The pass-pipes are arranged in two sets, namely, a "first" set of pass-pipes, 2–8, and a "second" set of pass-pipes 11–17. The combustion tube, the first set of pass-pipes and the second set of pass-pipes are surrounded by an outer casing containing a coolant, usually water, with which the said combustion tube and pass pipes are in contact. The coolant water is commonly called the "charge water." In practice each set of pass pipes may include as many as 700 pipes, but for the sake of clarity, only seven pipes are shown in each set.

When the boiler is in use, the flame extends substantially along the length of the combustion tube 1. The greater proportion of the fuel undergoes combustion in the combustion tube but a small amount is left in the exhaust gases which enter the first set of pass-pipes at temperatures of about 1100° C. The exhaust gases leave the first set of pass-pipes at approximately 550° C., pass through the second set of pass pipes and are then vented to the air. The unburnt fuel remaining in the exhaust gases condenses at about 250° C. in the second set of pass-pipes causing deposits of soot and hydrocarbons to build-up.

There are a number of disadvantages in operating a conventional shell boiler. Firstly, since a small proportion of the total fuel does not undergo combustion in the combustion tube, no heat will be produced from that small proportion of the total fuel so the efficiency of the fuel is reduced. The efficiency of the boiler is defined in this specification as the ratio of heat actually used in heating and evaporating the charge water to the heat that would be produced by the complete combustion of the fuel supplied to the boiler.

Secondly, the small proportion of fuel that remains in the exhaust gases as they flow through the first set of pass-pipes condenses in the second set of pass-pipes. Deposits of soot and hydrocarbons build-up and these result in a reduction in the transfer of heat from the exhaust gases through the walls of the pass-pipes to the feed water in the boiler. Further, the flow of the exhaust gases is physically impeded as the deposits build up. At regular intervals the shell boiler has to be taken out of service to enable at least the second set of pass pipes to be cleaned. This is a time consuming and costly business when between 100 and 700 tubes have to be cleaned.

Thirdly, some of the carbon monoxide present in the exhaust gases is brought into contact with the walls of the second set of pass-pipes by the hydrocarbon condensate which is formed thereon from the unburnt fuel. The carbon monoxide then permeates the metal of the tubes making the metal brittle and this may, in extreme cases, result in fracture of the pipes.

Fourthly shell boilers are normally adjusted to operate with an excess of air, of between 0.1% to 30% in an attempt to achieve complete combustion of the fuel in the combustion tube and so inhibit the deposition of any unburnt fuel in the second set of pass-pipes. The efficiency of the boiler is reduced in this way since more air is heated and vented to the atmosphere.

All the foregoing disadvantages result, either directly or indirectly, from the incomplete combustion of the fuel in the combustion tube of a conventional shell boiler. This results in unburnt fuel issuing from the combustion tube and it is an object of the present invention to overcome the foregoing disadvantages, either in whole or in part.

To this end we seek to improve the combustion of the fuel. By this is meant either making the combustion of the fuel complete or making it more nearly complete than it would be in the absence of the present invention, and thereby, at least reducing the quantity of unburnt fuel which issues from the combustion tube of the shell boiler.

According to a first aspect of the present invention, a method of removing at least a proportion of any unburnt fuel from a stream of exhaust gas issuing from a combustion tube of a shell boiler comprises positioning a catalyst between first and second sets of pass-pipes of the boiler such that at least a proportion of any unburnt fuel in the exhaust gases undergoes catalytic combustion. Preferably, the catalyst comprises a ceramic or metallic support coated with an intermediate layer of a refractory metal oxide on which is deposited a catalytic material selected from the group consisting of ruthenium, rhodium, palladium, iridium and platinum and alloys of the said metals with each other and with one or more base metals.

According to a second aspect of the present invention a method of removing at least a proportion of any unburnt fuel from a stream of exhaust gas issuing from a combustion tube of a shell boiler comprises passing the said exhaust gas over one or more catalytic zones disposed upstream or downstream of the first and/or any subsequent set or sets of pass pipes such that at least a proportion of the remaining fuel undergoes catalytic combustion. Preferably, each catalytic zone comprises a layer of a refractory metal oxide secured to the inner wall of a pass-pipe with a catalytic material selected from the group consisting of ruthenium, rhodium, palladium iridium and platinum and alloys of the said metals with each other and with one or more base metals, deposited on the layer of refractory metal oxide.

Preferably, in both the first and second aspects of the invention, the refractory metal oxide layer, commonly called "the washcoat," has a high surface area. The washcoat may comprise one or more of the metal oxides selected from beryllia, magnesia, alumina or silica or one or more combinations of metal oxides such as boria-alumina or silica-alumina.

The remaining fuel present in the exhaust gas after combustion of the major proportion of the fuel in the combustion tube of the shell boiler, will undergo catalytic combustion when it makes contact with a catalyst in the presence of only a stoichiometric quantity of oxygen. The initial mixture of fuel and air introduced into the combustion tube can, therefore, be adjusted to a stoichiometric ratio thereby improving the efficiency of the boiler.

As previously mentioned the catalytic material is deposited on a ceramic or metallic support with an intermediate layer of "washcoat" comprising one or more refractory metal oxides. The support is preferably an inert, unitary, porous, metallic or ceramic honeycomb substrate, commonly called a monolith, having an array of gas-flow channels in the direction of the exhaust gas flow.

We particularly prefer a metallic monolith of the following dimensions:
Length: 1 inch
Diameter: 2 inches
Cell Density: 200 cells/inch$^2$ We prefer the monolith to be sited between the first and second sets of pass-pipes. We also prefer that the 'back-pressure' which is the difference in the pressure of the exhaust gas before it passes through the monolith coated with catalytic material and after it has passed through such a monolith, should be low.

In the manufacture of the pass-pipes used in the embodiment according to the second aspect of the present invention, in which the catalytic zones are formed in the first and/or in the second pass-pipes, the said pipes are, preferably, placed in a furnace at a temperature of between 100° C.–800° C. for a period of between 30 minutes and 5 hours to produce an oxide layer on the surface of the pipes to act as a key for the washcoat layer, which layer is applied to the tubes before application of the catalytic metal alloy. An alternative method of preparing the pipes is described in our co-pending U.S. patent application Ser. No. 876,565 filed on Feb. 2, 1978.

Although specific reference has been made to the use of a catalyst to produce catalytic combustion of unburnt fuel in the exhaust gases of a shell boiler, the underlying concept can also be used for catalytic combustion of such gases at any position within the exhaust system of any boiler.

I claim:

1. A shell boiler comprising a housing, a primary flame combustion chamber in said housing, an inlet for leading a fuel or a fuel/gas mixture into said primary flame combustion chamber whereby the fuel or fuel/gas mixture is burned to generate hot exhaust gases, at least two arrays of pipes in series with and separate from the primary combustion chamber adapted to receive the hot gases from said primary flame combustion chamber, an exit in said housing communicating with the last of said arrays for leading exhaust gases away from the boiler and fluid heat transfer means for taking up heat from the exhaust gases and thereby cooling the pipes and the primary combustion chamber, characterised in that the boiler includes at least one secondary combustion chamber in communication with the primary combustion chamber so as to receive exhaust gases therefrom, said secondary combustion chamber being disposed at a position intermediate the first array of pipes and the second array of pipes and including a catalyst disposed in such a position that at least a proportion of any unburnt fuel/gas mixture in the exhaust gases leaving the primary combustion chamber undergoes catalytic combustion in the secondary combustion chamber, the said catalyst comprising a ceramic or metallic support, an intermediate layer of a refractory metal oxide and a catalytic material selected from the group consisting of ruthenium, rhodium, palladium, iridium and platinum and alloys of the said metals with each other and with one or more base metals.

2. A shell boiler comprising a housing, a primary flame combustion chamber in said housing, an inlet for leading a fuel or a fuel/gas mixture into said primary flame combustion chamber whereby the fuel or fuel/gas mixture is burned to generate hot exhaust gases, at least two arrays of pipes in series with and separate from the primary combustion chamber adapted to receive the hot gases from said primary flame combustion chamber, an exit in said housing communicating with the last of said arrays for leading exhaust gases away from the boiler and fluid heat transfer means for taking up heat from the exhaust gases and thereby cooling the pipes and the primary combustion chamber, characterised in that the boiler includes at least one secondary combustion chamber in communication with the primary combustion chamber so as to receive exhaust gases therefrom, and in that the secondary chamber includes a catalyst disposed in such a position that at least a proportion of any unburnt fuel/gas mixture in the exhaust gases leaving the primary combustion chamber undergoes catalytic combustion in the secondary combustion chamber, the said catalyst comprising a ceramic or metallic support, an intermediate layer of a refractory metal oxide and a catalytic material selected from the group consisting of ruthenium, rhodium, palladium, iridium and platinum and alloys of the said metals with each other and with one or more base metals, the secondary combustion chamber comprising the second array of the said array of pipes, and the said catalyst being supported on at least some of the internal walls of the said array of pipes.

* * * * *